(12) United States Patent
Bentley

(10) Patent No.: US 6,934,298 B2
(45) Date of Patent: Aug. 23, 2005

(54) HOT STANDBY ACCESS POINT

(75) Inventor: Kevin R. Bentley, Oro Valley, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 52 days.

(21) Appl. No.: 10/339,050

(22) Filed: Jan. 9, 2003

(65) Prior Publication Data

US 2004/0136318 A1 Jul. 15, 2004

(51) Int. Cl.[7] .............................................. H04L 12/413
(52) U.S. Cl. ....................... 370/447; 370/461; 370/462
(58) Field of Search ................................. 370/328, 338, 370/216, 401, 445, 447, 461, 462

(56) References Cited

U.S. PATENT DOCUMENTS

| | | | | | |
|---|---|---|---|---|---|
| 5,268,899 | A | * | 12/1993 | Brown ........................ | 370/448 |
| 5,913,921 | A | * | 6/1999 | Tosey et al. ................. | 709/220 |
| 6,505,045 | B1 | * | 1/2003 | Hills et al. ................... | 455/449 |
| 6,553,218 | B1 | * | 4/2003 | Boesjes ....................... | 455/406 |
| 2001/0021170 | A1 | | 9/2001 | Hansson et al. ............ | 370/217 |
| 2002/0019725 | A1 | * | 2/2002 | Petite .......................... | 702/188 |
| 2003/0224728 | A1 | * | 12/2003 | Heinonen et al. ........... | 455/41.2 |
| 2004/0114559 | A1 | * | 6/2004 | Wang .......................... | 370/338 |

FOREIGN PATENT DOCUMENTS

WO     WO 96/12993     5/1996

OTHER PUBLICATIONS

Release Notes for Cisco Aironet 340 and 350 Series Access Points Running Fireware Version 11.05a, 2002, Cisco System, Inc.*

Cisco Systems Pioneers Enterprise Deployment of Wireless Networks with Next Generation Cisco Aironet 350 Series, Jan. 24, 2001, Cisco Systems, Inc.*

\* cited by examiner

*Primary Examiner*—Chi Pham
*Assistant Examiner*—Keith M. George
(74) *Attorney, Agent, or Firm*—Quarles & Brady Streich Lang LLP; Les A. Boegemann

(57) ABSTRACT

A group of wireless APs, including an active primary AP and one or more inactive backup APs, responds to the failure of the active AP. Backup APs passively detect the absence of the primary AP from a coverage area and become active. If more than one Backup AP attempts to assume the role of the primary AP, contention is resolved by applying a conflict resolution algorithm.

26 Claims, 3 Drawing Sheets

HOT STANDBY WIRELESS ACCESS POINT STATE DIAGRAM

HOT STANDBY ACCESS POINT

BACKGROUND OF THE INVENTION

1. Field of the Invention

This invention is related in general to the field of wireless communications networks. In particular, the invention comprises a group of access points only one of which is active at any given time. Inactive back-up access points periodically test for the presence of an active access point. If an active access point is not found, the back-up access point will become active.

2. Description of the Prior Art

The IEEE 802.11b specification allows for the wireless transmission of approximately 11 million bits per second of digital data at indoor distances up to a few hundred feet and outdoor distances up to tens of miles over a 2.4 gigahertz radio broadcast band. This broadcast band can be used for just about any type of digital communication.

Transceivers referred to herein as access points ("APs"), are connected to mobile stations by the transmission and reception of radio signals. A mobile station transmits information to an AP. The AP can either broadcast the received information to other mobile stations or can pass the information to an attached network, such as an Ethernet local area network ("LAN"). Additionally, mobile stations may communicate with other mobile stations that are connected through the wired LAN to another AP.

It is well known in the art that APs are distributed according to the desired area of coverage. The area of effective transmission and reception depends on transmission strength, type of reception antennae and line-of-sight obstructions. In order to assure uninterrupted communication between APs and mobile stations, redundant APs are placed within a coverage area forming a group. This group comprises an active primary AP and one or more inactive back-up APs. Should the primary AP fail or cease to communicate with the mobile stations in its area, one or more back-up APs become active.

However, present methods for activating redundant APs are inefficient. One method requires human intervention to detect the failure of a primary AP and activate a backup AP. In some applications, such as mining operations, this may require that the operator travel significant distances to reach the various AP locations. This results in substantial periods of time during which mobile stations are unable to communicate through the wireless network.

Another method for activating redundant APs is to have each AP in a coverage area continually transmit probe requests. These probe requests require responses from other APs and mobile stations connected to the communication network. The probing AP uses the responses to determine the status of the communication network. If an AP determines that the network does not include a primary access point, it then becomes active. However, this method of redundancy requires that all access points continually transmit probe requests and analyze responses from the communication network. This continuous probing reduces the bandwidth of the communication network by tying up transmission resources and creating collisions with other probe requests and data transmissions.

Therefore, it would be desirable to have a practical means for activating backup APs that does not require human intervention. Additionally, it would be desirable for backup APs to detect the failure of a primary AP without negatively impacting the data transmission bandwidth of the wireless communication network. Furthermore, if more than one backup AP is available in a group, it would be desirable for the backup APs to determine, between themselves, which AP will become the primary AP.

SUMMARY OF THE INVENTION

One primary objective of this invention is a means for a back-up AP to detect when no other access point is operating as an active access point within its group or coverage area.

Another objective of the invention is a means for a backup access point to become active and assume the role of the primary AP.

Yet another objective is a means for resolving contention between two or more active access points which are simultaneously attempting to become the primary AP.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of requiring that access points in a wireless communication network passively detect if other access points are active. By utilizing passive detection in a data transmission system, the adverse impact of transmitting probe signals and receiving response messages is reduced.

Figure 1:
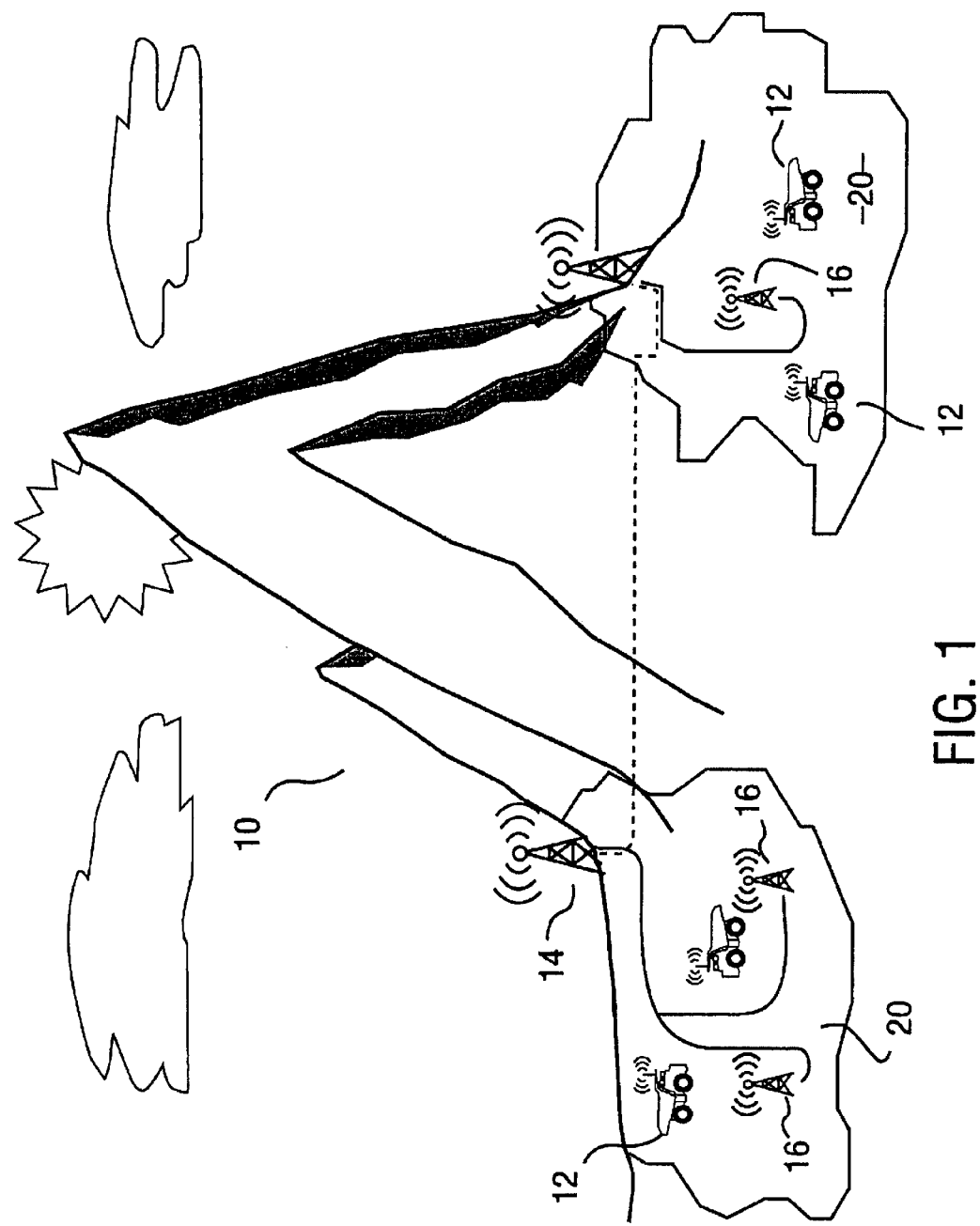
FIG. 1 is an illustration on the invention in a strip-mining environment.
Figure 2:
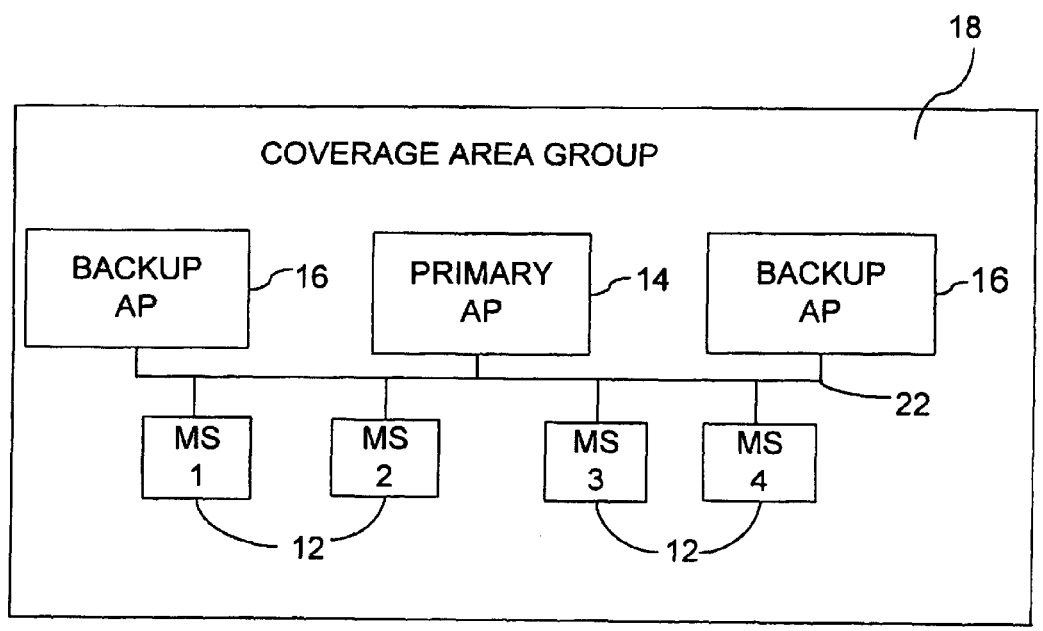
FIG. 2 is a block diagram of the principle components of the invention.

Referring to the figures, FIG. 1 is an illustration of a wireless communication system 10 that includes mobile stations 12, primary APs 14, and backup APs 16 in a strip-mining environment. A group 18 is formed by combining a primary AP 14 with one or more backup APs 16 within a coverage area 20. Communication between the access points 14, 16 within a group and mobile stations 12 within the coverage area 20 occurs over a wireless communication system. FIG. 2 is a block diagram of a coverage area group 18, mobile stations 12, a primary AP 14, backup APs 16, and a communication channel 22.

In the preferred embodiment, the communication channel 22 is a radio broadcast band utilizing the IEEE 802.11b standard for transmitting and receiving digital signals. However, the wireless communication system could be any system that transmits and receives either analog or digital information such as a telephone or satellite communication system.

Multiple access points are used to provide redundancy in case one of the access points fails. Utilizing the 802.11b standard, access points 14, 16 within a coverage area 20 are configured with similar network settings so that they appear as a common access point to mobile stations. This results in a coverage area being defined both as a geographical area and a specific set of communication addresses that are jointly recognized by the access points and mobile stations. Mobile stations that are not authorized to communicate with the access points, even if within the physical area serviced by the access points, are not within the coverage area 20.

Separate coverage area groups 18 may be joined together to form an expanded coverage area. Bringing together disparate groups 18 may be accomplished by any of a plethora of combinations of wired and wireless communication networks. For example, a computer network such as a local area network or the Internet may join the groups 18. Similarly, a telephone communication system or a satellite transmission system could connect the groups.

To prevent multiple access points from attempting to communicate with mobile stations 12, only one of the access points is designated a primary AP 14. Primary APs are those that are responsible for managing the communication channel of the wireless network. Active access points are those that are either primary or attempting to become primary. Other access points are designated as backup APs 16, are inactive, and do not participate in the management of the communication channel.

The method of determining which access point is the primary AP and which ones are backup APs can be either arbitrary or planned. In one example of the invention, each access point could be given a priority number and only could become a primary AP if no other access points with a lower priority number are active. However, in the preferred embodiment of the invention, each access point becomes active when it is first powered on. Once active, it listens for activity from other access points. If other activity is detected, the access point that has just powered-on will implement a conflict resolution algorithm. If no activity is detected, the active access point will become the primary AP and will begin managing the communication channel.

Both active and inactive access points listen for activity on the communication channel 22. Inactive access points listen to the communication channel to determine if they should become active. Inactive access points listen to determine if contention exists between themselves and other active access points.

Figure 3:
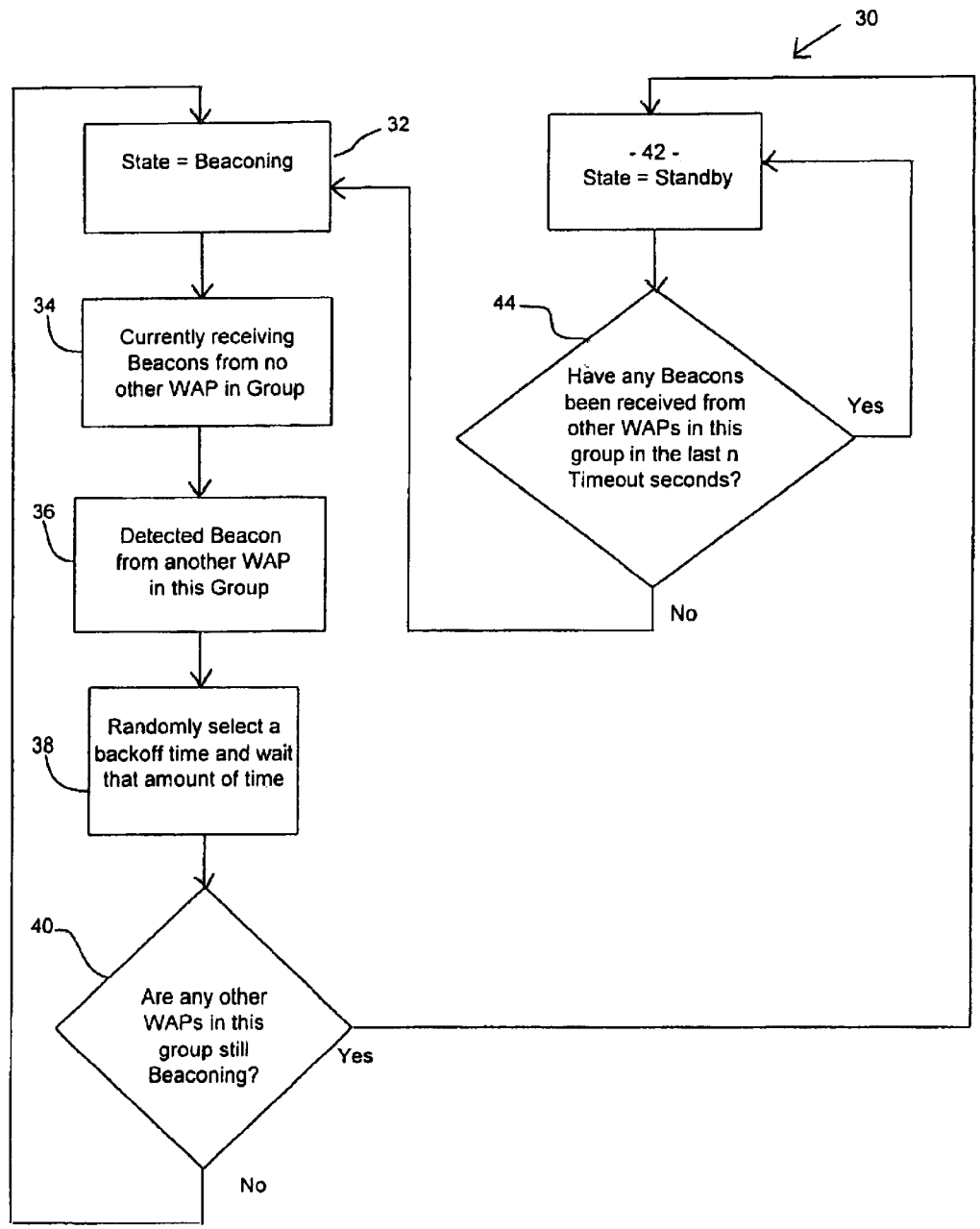
FIG. 3 is a flow chart illustrating the process of detecting the failure of a primary AP, the activation of a back-up AP, and the resolution of contention between two or more back-up APs according to the invention.

FIG. 3 is a flow-chart illustrating a conflict resolution algorithm 30, according to the preferred embodiment of the invention. In step 32, an active access point transmits a beacon signal that notifies other access points that it is active and listens at step 34 for beacons from other access points within the coverage area group 18. Once another beacon has been detected at step 36, each active access point generates a random number representing a period of time 38. After waiting the prescribed amount of time 38, the access point again listens for other beacon signals 40. If no other access points continue to broadcast beacons, the remaining active access point becomes the primary access point.

However, if other access points remain active, this access point enters standby mode at step 42 and becomes an inactive backup access point. Once inactive, the access point listens for beacons from other access points at step 44. If no other access points are broadcasting, this access point become active 32 and begins broadcasting beacons.

Others skilled in the art of making wireless communication systems may develop other embodiments of the present invention. For example, active primary APs may be connected through other bridging APs that form a hierarchical wireless network rather than connecting APs through a wired LAN. Similarly, the communication system could be formed from any of countless combination of wired and wireless communication components. Therefore, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A wireless communication network providing an area of coverage, comprising:
   an active primary access point available for wireless communication with mobile access stations within the area of coverage, wherein said active primary access point is adapted to listen for activity from other access points and implement a contention resolution procedure if activity is detected; and
   at least one inactive backup access point wirelessly connected to the primary access point; wherein the at least one backup access point passively detects whether any other access points are active.

2. The wireless communication network of claim 1, wherein all access points become active when turned on.

3. The wireless communication network of claim 2, wherein the at least one backup access point listens for activity from other active access points and become active if no other activity is detected.

4. The wireless communication network of claim 3, wherein a contention is created between a plurality of active access points and the contention is resolved so that only one access point remains active and becomes the active primary access point while all other access points become inactive.

5. The wireless communication network of claim 4, wherein said contention is resolved by each active access point generating a random number representing a respective period of time; each active access point waiting the respective period of time; each active access point listening for activity from other access points; and each active access point becoming inactive if said activity is detected.

6. The wireless communication network of claim 5, wherein a plurality of active primary access points is interconnected to form an expanded area of coverage.

7. The wireless communication network of claim 6, wherein the plurality of active primary access points is interconnected by another wireless communication network.

8. The wireless communication network of claim 7, further comprising a satellite communication system.

9. The wireless communication network of claim 6, wherein the plurality of active primary access points is interconnected by a wired communication network.

10. The wireless communication network of claim 9, wherein the wired communication network further comprises a local area network.

11. The wireless communication network of claim 6, wherein the plurality of active primary access points is interconnected by a combination of wired and wireless communication networks.

12. The wireless communication network of claim 11, wherein the wired communication network further comprises a local area network.

13. The wireless communication network of claim 11, further comprising a satellite communication system.

14. The wireless communication network of claim 6, wherein the plurality of active primary access points is interconnected by a telephone communication system.

15. A method of providing a redundant area of coverage in a wireless communication network, comprising the steps of:

provinding an active primary access point adapted to provide a wireless connection to at least one mobile access point and to initiate a contention resolution procedure if activity is detected on the wireless connection;

wirelessly connecting at least one inactive backup access point to the active primary access point; and programming the at least one inactive backup access point to passively detect whether the active primary access point is active.

16. The method of claim 15, wherein all access points become active when turned on.

17. The method of claim 16, wherein the at least one backup access point listens for activity from other active access points and becomes active if no activity is detected.

18. The method of claim 17, wherein a contention is created between a plurality of active access points and the contention is resolved so that only one access point remains active and becomes the active primary access point while all other access points become inactive.

19. The method of claim 18, further comprising the steps of:

generating a random number representing a respective period of time for each active access point;

requiring each active access point to wait the respective period of time;

directing each active access point to listen for activity from other access points; and having each active access point become inactive if said activity is detected.

20. The method of claim 19, further comprising interconnecting a plurality of active primary access points to form an expanded area of coverage.

21. The method of claim 20, wherein the plurality of active primary access points is interconnected by another wireless communication network.

22. The method of claim 21, further comprising transmitting and receiving communications over a satellite communication system.

23. The method of claim 20, wherein the plurality of active primary access points is interconnected by a wired communication network.

24. The method of claim 20, wherein the plurality of active primary access points is interconnected by a combination of wired and wireless communication networks.

25. The method of claim 24, further comprising transmitting and receiving communications over a satellite communication system.

26. The method of claim 20, wherein the plurality of active primary access points is interconnected by a telephone communication system.

* * * * *